April 17, 1951 D. W. EPSTEIN 2,549,585
MULTIPLE TELEVISION PROJECTOR
Filed April 29, 1947 3 Sheets-Sheet 1
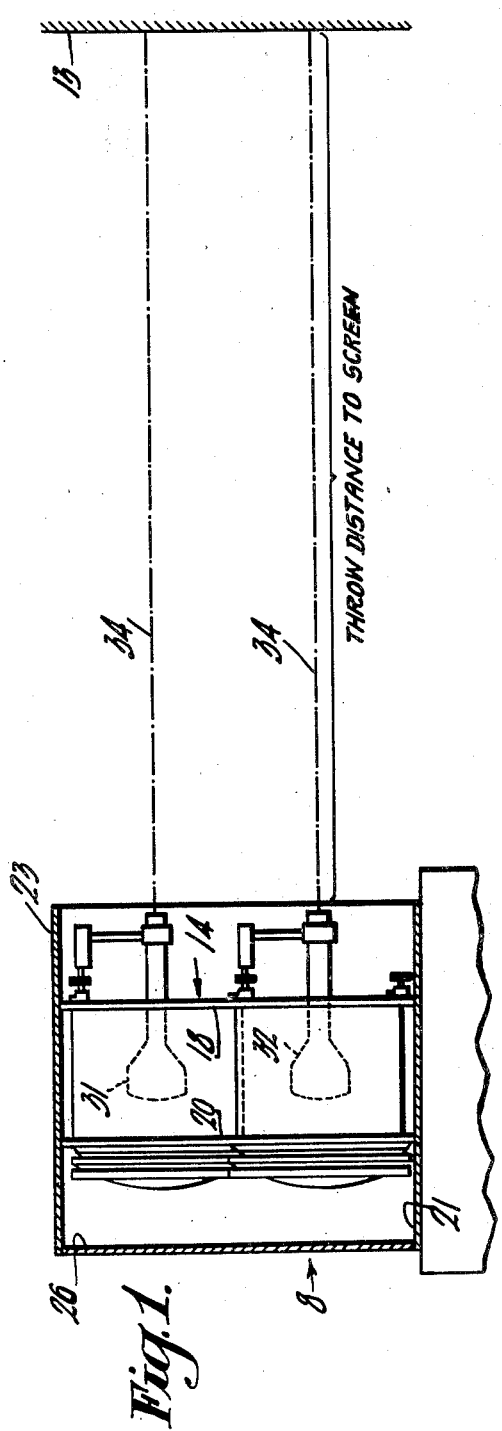
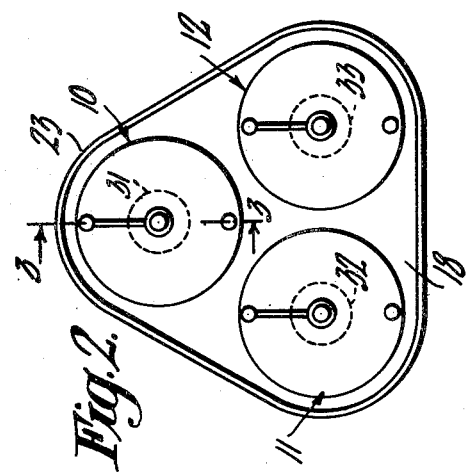
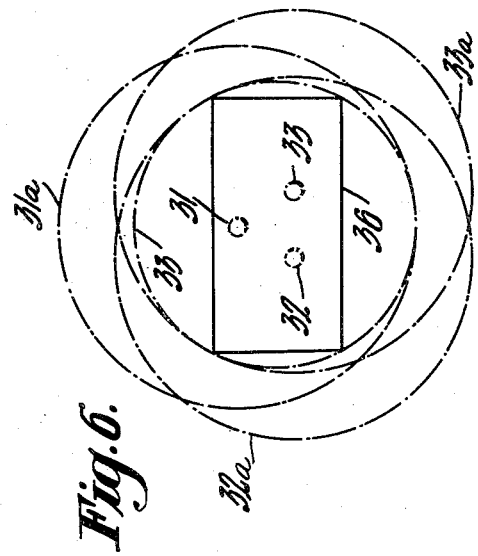
INVENTOR.
David W. Epstein
BY H. S. Grover.
ATTORNEY

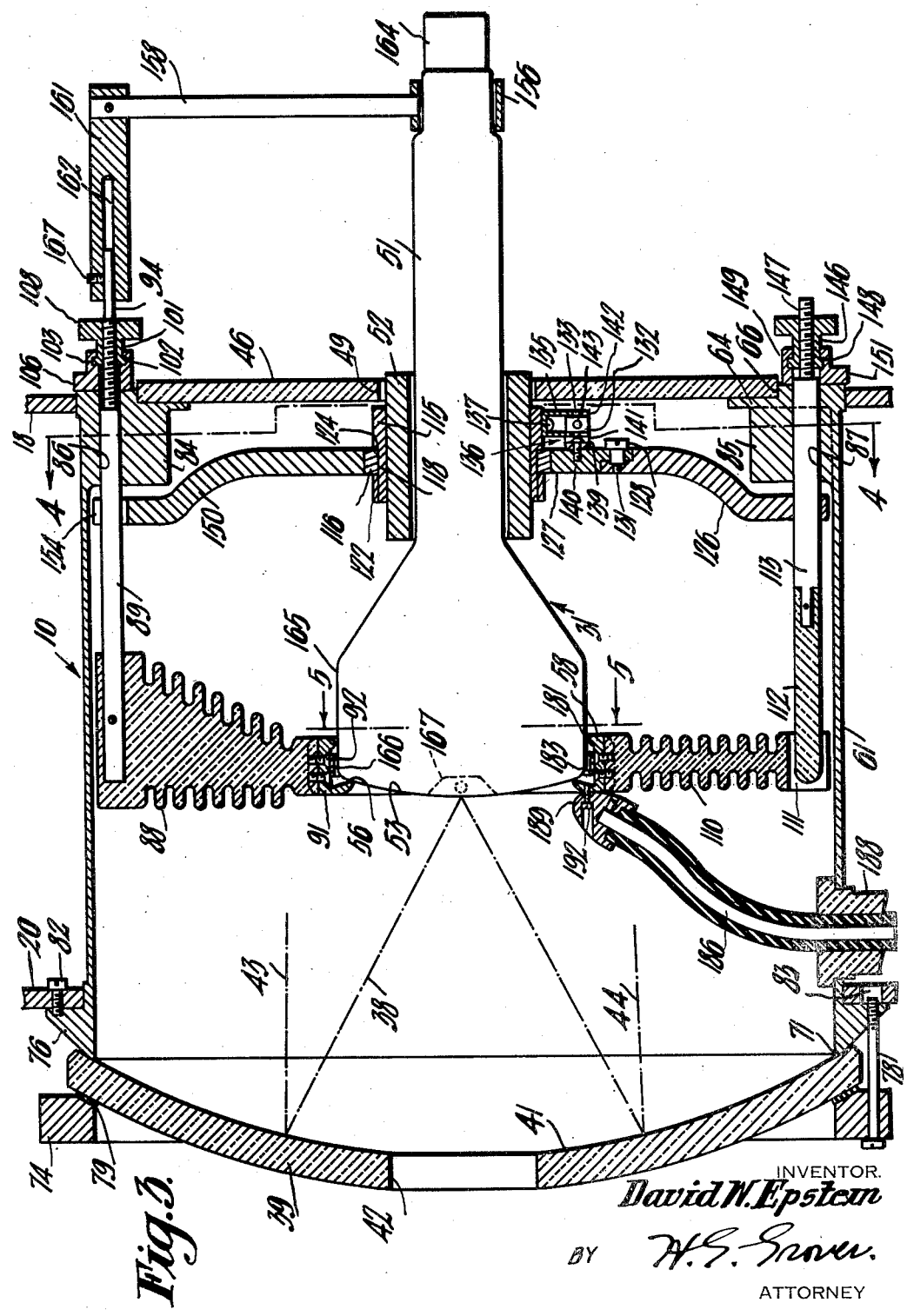

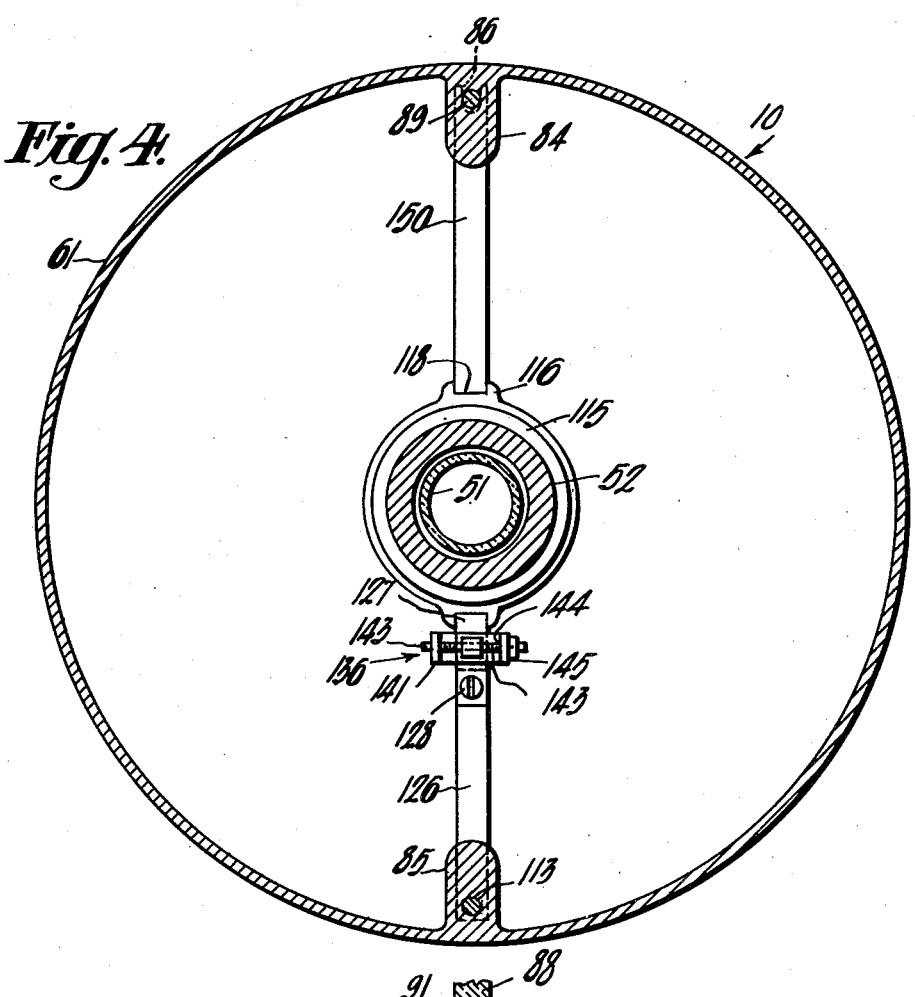
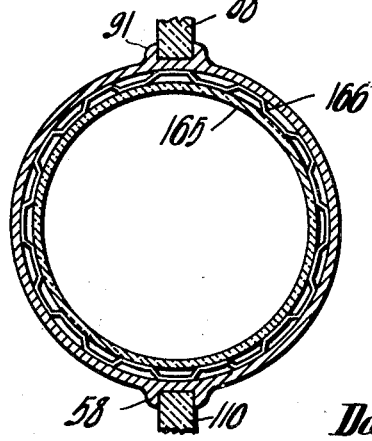

Patented Apr. 17, 1951

2,549,585

UNITED STATES PATENT OFFICE 2,549,585

MULTIPLE TELEVISION PROJECTOR

David W. Epstein, Princeton, N. J., assignor to Radio Corporation of America, a corporation of Delaware Application April 29, 1947, Serial No. 744,715

5 Claims. (Cl. 178—5.4)

The present invention relates to systems for projecting images produced by the image re-creating device or devices of a television receiver or the like, and more particularly, although not necessarily exclusively, to a multiple projector in which provision is made for accurate superposition of produced images on a screen, or viewing surfaces and, also, in which substantially precise accuracy of the optical relationship of the parts of each individual projector is maintained as well as the alignment and positioning of the deflecting fields with respect to the deflecting means or mechanism of the associated image producing device. The image producing device most commonly used is a cathode ray tube and, therefore, its deflectable means comprises a cathode ray beam. The beam is deflected by electromagnetic or electro-static fields varying together with a certain predetermined relationship. More commonly these fields combine to produce horizontal or the more commonly termed "line" and vertical or the commonly termed "field" or "frame" components of movement of the cathode ray beam. Adjustment of the deflecting means for the deflectable means or mechanism of the image producing device is important in a projector where the optical parts must be in correct alignment and focus adjustment, and it is more important still in a multiple projector where registration of a plurality of images is necessary.

Acceleration of the beam to produce high intensities of image luminosity requires a high cathode ray tube voltage and, therefore, the invention is also directed to provision of protective installations and dispositions for preventing corona effects.

An important aim or object of the present invention is to provide for accurately superpositioning a plurality of projected images on a viewing surface, such as the exposed surface of an opaque or translucent viewing screen. Another closely related object is to provide for the registration by electrical means of a plurality of images from projectors which have their optical axes substantially parallel.

A further object resides in the provision of a novel image projector having a plurality of separate image producing devices.

Still another object is to provide a novel projector incorporating an image producing device and an optical system for imaging the light pattern of said image producing device on the exposed surface of a viewing screen.

Still another object is to provide novel adjustable features for the elements of an image projector.

Still another object is to provide protection against corona effects in the high voltage connections of a cathode ray tube.

Still another object is to provide a novel holding means for the body or bulb of a cathode ray tube.

Still another object is to provide novel adjustments for the deflecting means which produces deflection of the deflectable means or mechanism of the image producing device of an image projector.

Other objects and advantages of the invention will, of course, become apparent and immediately suggest themselves to those skilled in the art to which the invention is directed from a reading of this specification in connection with the accompanying drawings in which:

Fig. 1 is a view in side elevation of a projector embodying the invention which is capable of projecting a plurality of images for superposition in accurate register on the viewing surface of a viewing screen or other surface;

Fig. 2 is a view in elevation of the projector of Fig. 1 as seen from the right-hand side;

Fig. 3 is a view to an enlarged scale in sectional elevation of one of the projector units shown in Figs. 1 and 2, the section being taken on line 3—3 of Fig. 2;

Fig. 4 is a view in cross section along the line 4—4 of the unit shown in Fig. 3, the image producing tube being omitted;

Fig. 5 is a fragmentary view in section on line 5—5 of Fig. 3; and

Fig. 6 is a diagram disclosing the manner of obtaining registration of images in accordance with the invention.

Referring to Figs. 1 and 2 of the drawings, which show the general organization of a television projection system 8, embodying the invention in one of its possible forms, the system is seen to comprise three more or less independent projection units designated 10, 11 and 12. Each unit projects an image along an optical path toward a viewing screen, for example the screen 13 indicated in Fig. 1, and the optical axes of these optical paths, by reason of the teachings of this invention are maintained parallel or substantially parallel, but, nevertheless, a single registered image is formed. The units 10 to 12 are carried by the mounting structure 14 comprising two end plates 18 and 20 which are joined to a base plate 21 in any suitable manner. A cover or hood 23 has a back wall 26 and projects forwardly beyond the end plate 18 to form a light hood and to protect the exposed parts of a plurality of the image producing cathode ray tubes, three in number in the illustrative example, which are designated by reference characters 31, 32 and 33. It is to be understood that a suitable support (not shown) is provided for the mounting structure 14 so that the projected images may be aimed at a suitable viewing screen, the screen 13 for example. The latter may be of the ordinary reflecting type or it may be translucent. The previously mentioned support for the structure 14 may be of the portable type and may, if desired, include apparatus suitable for operating the cathode ray tubes 31 to 33.

The projector units 10 to 12 may be provided with component color separation filters (not shown), and in the tricolor arrangement selected by way of example, these three filter sections are usually the component colors blue, green and red of an additive color system.

All of the tubes 31 to 33 may operate continuously and simultaneously at any selected field or frame repetition rate so that the combined viewed image is the result of the simultaneous operation of all of the tubes. On the other hand, without departing from the intent of the invention, the various tubes 31 to 33 may operate in sequence so as to produce the observable final color images in a sequential manner, as is customary with the so called sequential type of color television system. In this latter form of operation a suitable operational cycle for the tubes is usually established so that while each tube produces a field of the composite polychrome or multi-color image in one selected color, for instance, it will, in the double interlace system, alternately produce in its successive operational periods the line traces representing first the even lines and then the odd lines, and so on. It will be understood that the choice of component colors in which the images are to be recreated and the exposure sequence of the selected colors will depend entirely upon the color system for which the projector is used. Since the mode of operation and details of such color systems as the above mentioned simultaneous and sequential types are not a part of the present invention, they are not illustrated nor will they be further described. Technically in a polychrome television system it is largely immaterial as to what type luminescent compounds are used to coat the screen or target areas of the several cathode ray image producing tubes 31 to 33. Good quality color can be had where all tubes use a luminescent compound to create the several component color images in black and white monochrome when appropriate component color filters in the selected component colors of the adopted additive polychrome system are used with the individual tubes, or are associated with the correcting or aspherical zone plate, preferably in its flat side. In many instances, however, the tubes may have the screen or target area coated with luminescent compounds which directly produce light of the selected component color so that component color filters need not necessarily be used. In instances where the used luminescent compound is not suitable for producing light in exactly the selected component color, it is often possible to produce light in the tube of a color which is close in the spectrum to that desired and then to use in supplement thereto and in combination therewith a suitable component color filter which will insure the correct color light then being made observable to any viewer.

To refer to one suitable and illustrative form of arrangement which has been found satisfactory in operation, and which is represented by the illustrative arrangement of Figs. 1 and 2 shown by way of example, the unit 10 will be assumed to project a green image, the unit 11 assumed to project a red image and the unit 12 assumed to project a blue image. The phosphors (tube targets) of the tubes 31 and 33 are selected to produce green and blue light respectively. The phosphor of the tube 32 produces orange light and a suitable red filter selects red light for projection. It will be understood that filters may be provided for all of the tubes and the optimum location for the filters is against the flat side of the corresponding aspheric zone plate.

While employment of the multiple projector of this invention for projecting color images to form a colored television image has been discussed in the foregoing, it will be understood the tubes 31 to 33 may each produce and project the same image in substantially the same color to give a monochrome image upon a screen so that greater light intensity of the projected image is obtained. The suggested television uses of applicant's invention herein described are in nowise to be construed as restrictive of applicant's invention in use.

Referring to Figs. 1 and 6 of the drawings, the optical axes of the projector units 10 to 12 are shown conventionally as dot-dash lines labeled 34. Each axis 34 coincides with the axis of the optical system of the corresponding projector unit and by reason of the tube holding arrangement referred to generally above, and to be described hereinafter, to the exact approximate center of the exposed target face of each cathode ray tube. Fig. 6 of the drawings is a geometrical diagram and the plane of this figure corresponds to the viewing plane of the screen 13, or its equivalent, in use. The target faces of the cathode ray tubes 31 to 33 are indicated by correspondingly numbered circles shown in dot-dash outline. Corresponding circles labeled 31a, 32a and 33a indicate magnification of the tube ends by the optical system at the plane of the screen 13, assuming that the entire target area of each tube is rendered luminous and the light is projected on the viewing plane of the screen. These circles 31a to 33a overlap within a circle 35 and it is within this circle 35 that the outline or raster 36 of the accurately registered projected image is formed. Registry of the several images is accomplished by moving the image raster of each tube off center and this is readily accomplished by electrical means. For example, direct current of proper strength and polarity may be passed through the individual deflecting coils (not shown) of the deflecting yokes. The yoke for each tube is referred to hereinafter by reference character 52. For example, a United States Patent No. 2,223,990, granted December 3, 1940, to Ralph S. Holmes for "Cathode Ray Tube Apparatus," and an earlier United States Patent 2,007,380, granted July 9, 1935, to William J. Morlock, for "Cathode Ray Apparatus" disclose arrangements for shifting the produced pattern or raster on the target face of a cathode ray tube. Solely by way of example, with the apparatus shown illustratively in which the tube centers lie at the apexes of an equilateral triangle, the sides of which are approximately seventeen inches long, the image raster on each tube need be shifted off center approximately only a quarter of an inch.

Figs. 3 to 5 of the drawings show details of one of the units, the unit 10 for example, and the description of this unit will suffice for the other units 11 and 12. The unit 10 includes features of the invention disclosed in my copending application entitled "Television Projecting System" filed July 20, 1945, and bearing Serial No. 606,215, now Patent No. 2,455,476, issued December 7, 1948. For the sake of completeness of disclosure, the important elements of the unit 10 shown herein by Figs. 3 to 5 and also described and claimed in the aforesaid pending application, will be described in detail.

The image producing tube 31, which has a television image produced on its luminescent target 36, projects the television image along an optical path conventionally represented at 38 toward a reflecting element 39 having a spherical reflecting surface 41. A non-reflective portion of the surface 41 is provided in any suitable manner, for example by an aperture 42. The image which has been projected upon the reflecting surface 41 is then reflected therefrom along the optical paths conventionally represented at 43 and 44 toward the previously mentioned viewing screen.

At an intermediate point in the optical path an aspheric zone plate 46 (also termed "correcting plate" or "correcting lens") is positioned to receive light reflected from the reflecting surface 41. The aspheric zone plate 46 is arranged externally to the light path from the tube to the reflector and is axially aligned with each. This zone plate is arranged to correct for spherical aberration introduced into the light rays by the curved reflecting surface 41 of the element 39 so that a sharply focussed reproduction of the image developed on the fluorescent or luminescent target area 36 of the tube 31 is produced on the previously mentioned viewing screen. The aspheric zone plate 46 has a central opening 49 for the purpose of accommodating the tube neck 51 and, if desired, the deflecting yoke 52 (shown conventionally) for producing deflection of the cathode ray beam within the tube 31. In accordance with one aspect of the invention, the deflecting yoke 52 is movable axially with respect to the tube 31; and for most tubes, which may be employed with the units 10 to 12, it is preferred that the central opening 49 be large enough to accommodate the yoke 52.

As shown in the drawings depicting the illustrative embodiment of this invention, the central opening 49 accommodates and surrounds the deflecting yoke 52 and has sufficient clearance to permit freedom of axial movement of the yoke.

The curved face 53 of the target end of the tube 31 rests upon a circular edge 56 provided by a ring 58. The contour and additional functions of the ring 58 will be discussed hereinafter. The face 53 of the tube 31 will be approximately spherical contour or exactly of spherical contour so that the ring provides the correct positioning of the tube face since a series of points, no less than three, may be arranged to furnish location of the tube 53. A discussion of the contour of the target face of the tube is to be found in United States Patent No. 2,273,801 granted February 17, 1943, to D. O. Landis. This patent discloses an arrangement whereby a spherical mirror is arranged to direct and focus light rays forming the enlarged television image upon a viewing screen with the aid of an aspheric correcting plate or correcting lens, which is also very frequently and commonly termed a zone plate.

The zone plate 46, as well as the ring 58, is located and supported through the agency of a cylindrical member 61.

The end 64 of the cylindrical member 61 is recessed as indicated by reference character 66 to provide a planar seat 68 for the aspheric zone plate. This seat is parallel to and coaxial with a circular edge 71 in contact with the spherical reflecting surface 41 of the reflecting element 39.

The cylindrical member 61 is clamped upon the reflecting surface 41 and the reflecting member 39, in turn, is clamped in a desired position by means of a ring 74. An annular projection 76 is provided on the cylindrical member 61 and is apertured, by drilling for example, at intervals to accommodate threaded clamping bolts 78 in threaded engagement with the internally threaded apertures. A gasket or washer 79 of yieldable material provides for cushioning the member 39 at its clamping edge.

The structure so far described is secured to the back wall 26 of the multiple projector 14 by suitable securing means, such as a plurality of circumferentially spaced screws 82. It will be seen that the bolts 78 do not engage the wall 26 but have ample clearance in apertures 83 in the wall 26. The positioning of the spherical reflecting element 39 is thereby made independent of the connection of the unit to the back wall 26.

The manner in which the ring 58 is supported to insure accurate positioning of the circular edge 56 and to provide axial adjustment of the tube 31 will now be described. Two holes 86 and 87, which are preferably reamed or broached, are located at diametrically opposite points in bosses 84 and 85 in the end 64 of the cylindrical member 61. An insulator 88, capable of withstanding high voltages, secured to one end of a rod 89 and serves as a principal support for the ring 58. The ring end of the insulator is seated in a slot 91 in the ring and the ring is secured to the insulator by suitable fastening means such as screws 92, for example. The rod 89 preferably has an accurate sliding fit in the hole 86. The end of the rod 89 opposite the insulator 88 has a portion of reduced diameter 94. A section of the reduced diameter portion 94 is threaded as indicated by reference character 98. An internally threaded sleeve 101 is in threaded engagement with the threads 98 and is provided with a projection or flange 102 received in a circular recess 103 formed in a member 106, the latter being secured to the top 64 of the cylindrical member 61. A thumb piece or knob 108 facilitates turning of the sleeve 101 for operating the adjusting arrangement just described. The rod 89 can be moved axially in either direction to change the distance between the tube target face 53 and the spherical reflecting surface 41. Lateral displacement of the ring 58 is prevented by an insulator 110, which has a groove or recess 111 at its end for slideably receiving a rod 112. The latter is preferably of insulating material and its position is accurately set by being secured to a rod 113. The latter is slideably received in the previously mentioned hole 87. The hole 87, it will be understood, is to be accurately located with respect to other parts of the projector unit 10. The insulator 110 need not be as massive as the insulator 88 since it is not called upon to move the ring 58 and the tube.

The previously mentioned deflecting yoke 52 fits in a sleeve 115 of suitable material. The sleeve 115, in the illustrative example, is of conductive non-magnetic material. A ring member 116 is provided with an aperture 118 to receive a reduced portion of the sleeve 115 and a ring nut or internally threaded sleeve 122, or its equivalent, serves to hold the shoulder 124 on the sleeve against the face of the member 116. The sleeve 115 is rotatably fitted in the aperture 118 of the member 116 to allow the yoke 52 to be rotated for adjustment purposes by a means to be described.

The rod 113 passes through and is secured to a supporting and driving rod 126 for the yoke carrying member 116. A rod 127 is secured to the ring member 116 and the rods 127 and 116 are detachably joined by suitable fastening means such as a screw 128 having a reduced threaded end 131.

The yoke 52 is moved to desired positions of angular adjustment by means of a nut 132 having trunnions 134. The trunnions are rotatably received in the upstanding arms 135 of a U-shaped bracket 136 which is secured by suitable fastening means such as screws 137 to the sleeve 115. A second U-shaped bracket 139 is secured by suitable fastening means, for example, screws 140 to the upstanding rod 127. Each arm 141 of the member 139 is provided with a slot 142 through which passes the shank of an adjusting screw 143. The threaded portion of this adjusted screw is threadedly engaged with the nut 132 and a shoulder 144 thereon seats against the inside of the arm 141. A collar 145 is secured at the end of the screw 143, and the shoulder 144 and the collar 145 cause the screw to be held against axial movement in the arms 141 and 142. The trunnions 134 cause the sleeve 115 to be rotated for adjusting the angular position of the yoke 52.

Movement is imparted to the driving rod 126 for moving the deflecting yoke axially of the tube 31 by means of a nut 146, which is in threaded engagement with the threaded reduced end 147 of the rod 113. The nut 146 is provided with a circular flange 148 received in a circular recess 149 in a member 151. The latter is secured to the top 64 of the cylindrical member 61. To prevent lateral movement of the yoke 52, the end of a rod 150 connected to the supporting member 116 is provided with a recess or groove 154, in which is slideably received the rod 89. This arrangement permits the yoke 52 to move with respect to the tube holder in tube 31, while at the same time maintaining radial alignment of the parts. The same is also true of the mounting for the ring 58.

The end of the tube neck 51 is received in and supported by a ring member 156 to which is secured a radially projecting arm or rod 158. This arm or rod 158 is connected to a rod 161 at right angle thereto, having a recess 162 for receiving the reduced end 94 of the rod 89. The recess 162 permits cathode ray tubes having variations in the length of neck to be held by the ring 156, the primary purpose of the latter being to prevent axial and radial displacement of the socket end of the tube and to hold the weight of a cable connecting socket 164 together with its leads (not shown). The desired amount of axial pressure to be exerted on the tube 31 to hold it against the circular edge 56 is maintained by a set screw 167.

The bulb end 165 of the tube is held in the ring 58 with a sufficient degree of firmness by means of a flat springy ribbon member 166, which is corrugated so as to have a generally wavy configuration along its length as best shown by Fig. 5 of the drawings. This ribbon member, by reason of the corrugations, exerts a firm pressure radially inwardly of the tube bulb at a sufficiently large number of points to hold the tube end 5 accurately in place by contact with the circular edge 56 of the ring 58.

The tube 31 is provided with the usual second anode external connection 167 to which a high voltage is to be applied. This voltage may be of the order of 100 kilovolts although in some present operations voltages of the range between 50 and 70 kilovolts have been used successfully so that special precautions are necessary to prevent corona effects in the connection to the second anode through its exposed connecting means or terminal 167. Connection to this terminal is made as shown in Fig. 5 by contact with the spring member 166. The terminal 167 of each tube is preferably large enough so that any one of the corrugations of the spring member 116 will engage it. The ring 58 is provided with a curved lip 181 which acts as a corona preventing means. Fastening screws 183 for securing the member 110 to the ring 58 are recessed in a groove in the ring so that they are not exposed as corona producing projections. A high voltage lead in the form of a heavily insulated cable 186 passes through an insulating bushing 188 in the wall of the member 61. A rounded smooth surfaced connector 189 provides electrical contact between the conductor in the cable 186 and the ring 58. A screw or other suitable fastening means 192, which connects the connector 189 to the ring 58 is deeply recessed in the connector so that it is not exposed as a corona producing projection.

An air blast for cooling purposes may be provided by a blower, not shown, which supplies a stream of air to the space between the walls 26 and 20. The apertures 42 permit entry of air to each blower unit for cooling purposes.

Fig. 6 of the drawings is diagrammatic and the proportions are given only to illustrate the principle of the method of obtaining image register. The projected image 36 may have the usual 4 to 3 aspect ratio.

Having now described the invention, what is claimed as new is:

1. A projector for superposing a plurality of images in accurate register to be viewed as a single image by an observer, comprising a plurality of projector units, each unit having a luminous image source, deflectable means for producing a bi-dimensional luminous image, deflecting means for producing deflection of said deflectable means, optical means in each projector for providing a projected focussed image, means in each projector for effecting a focusing adjustment for said optical means, and means independent of said focus adjusting means for adjusting the position of said deflecting means with respect to the deflectable means of said image producing device.

2. A cathode ray image projection device having a cathode ray tube, a tube supporting member having means for engaging the face of the tube to provide support for and position the tube face, means to align said tube supporting member whereby a tube placed thereon will be correctly aligned comprising an axially adjustable rod, a second axially adjustable rod, a slot in said tube supporting member to receive said second rod, a deflecting yoke for said cathode ray tube, means movably to support said yoke from said second named rod, and a slot in said yoke carrying means to receive said first named rod.

3. A cathode ray image projection device including a mirror having a spherical reflecting surface, an aspherical correcting plate and a cathode ray tube having a spherical target exposing surface, a correcting plate supporting means comprising a member having means to support the correcting plate substantially at the center of curvature of the spherical mirror, a tube supporting member having means for engaging the spherical tube face to provide support for and to position the tube face with respect to the spherical reflecting surface of the mirror, means to align said tube supporting member whereby a tube placed thereon will be correctly aligned comprising a rod connected to said correcting plate supporting means and being axially adjustable thereon, a second rod connected to said correcting plate supporting means and being axially adjustable thereon, a slot in said tube supporting member to receive said second rod, a deflecting yoke for said cathode ray tube, means to movably support said yoke on said second rod, and a slot in said yoke carrying member to receive first named rod.

4. An image projector including a mirror having a spherical surface, an aspherical correcting plate and a cathode ray tube having a target exposing surface, a tube supporting member, an axially adjustable rod connected to said tube supporting member, a second axially adjustable rod, a slot in said tube supporting member to receive said second rod, a deflecting yoke for said cathode ray tube, means including said second axially adjustable rod for supporting said yoke, and means serving as a guide to maintain operative relationship between said cathode ray tube and said deflecting yoke as the position of said yoke is adjusted.

5. A holder for a high voltage cathode ray tube, said holder being electrically conductive, an axial wall for surrounding the target end of a tube in said holder, a seat in said holder for the target end of a cathode ray tube, a corrugated spring member extending around and inwardly of said wall to embrace a tube in said holder adjacent its end, and an electrical connection to said holder whereby said corrugated member serves as an electric connector for said tube.

DAVID W. EPSTEIN.

REFERENCES CITED

The following references are of record in the file of this patent:

UNITED STATES PATENTS

| Number | Name | Date |
| --- | --- | --- |
| 2,224,287 | Busch | Dec. 10, 1940 |
| 2,273,801 | Landis | Feb. 17, 1942 |
| 2,294,820 | Wilson | Sept. 1, 1942 |
| 2,295,779 | Epstein | Sept. 15, 1942 |
| 2,306,862 | Borin | Dec. 29, 1942 |
| 2,389,646 | Sleeper | Nov. 27, 1945 |
| 2,417,446 | Reynolds | Mar. 18, 1947 |
| 2,424,513 | Stephan | July 22, 1947 |
| 2,453,003 | Edwards | Nov. 2, 1948 |
| 2,455,476 | Epstein | Dec. 7, 1948 |
| 2,484,345 | Hinz | Oct. 11, 1949 |

FOREIGN PATENTS

| Number | Country | Date |
| --- | --- | --- |
| 107,486 | Austria | June 1, 1939 |